(12) United States Patent
Voisine (10) Patent No.: US 9,562,567 B2
(45) Date of Patent: Feb. 7, 2017

(54) SPHERICAL BEARING WITH AXIALLY COMPRESSED ANNULAR SEAL

(71) Applicant: Roller Bearing Company of America, Inc., Oxford, CT (US)

(72) Inventor: James Voisine, Burlington, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 72 days.

(21) Appl. No.: 14/616,303

(22) Filed: Feb. 6, 2015

(65) Prior Publication Data

US 2015/0226256 A1    Aug. 13, 2015

Related U.S. Application Data

(60) Provisional application No. 61/937,401, filed on Feb. 7, 2014, provisional application No. 62/021,414, filed on Jul. 7, 2014.

(51) Int. Cl.
*F16C 33/74* (2006.01)
*F16J 15/52* (2006.01)
(Continued)

(52) U.S. Cl.
CPC ............ *F16C 33/74* (2013.01); *F16C 23/046* (2013.01); *F16J 3/042* (2013.01); *F16J 15/52* (2013.01); *F16C 11/0671* (2013.01)

(58) Field of Classification Search
CPC . F16C 11/0666; F16C 11/0671; F16C 17/105; F16C 23/043; F16C 23/045; F16C 23/046; F16C 33/74; F16J 3/042; F16J 3/043; F16J 15/52
See application file for complete search history.

(56) References Cited

U.S. PATENT DOCUMENTS 2,630,356 A    3/1953   Johnson
3,547,474 A    12/1970  Colletti et al.
(Continued)

FOREIGN PATENT DOCUMENTS

CN    2789498 Y    6/2006
CN    200942698 Y  9/2007
(Continued)

OTHER PUBLICATIONS

Extended European Search Report for European Patent Application No. 151726833-1760, dated Dec. 21, 2015.
(Continued)

*Primary Examiner* — James Pilkington
(74) *Attorney, Agent, or Firm* — MKG, LLC (57) ABSTRACT

A spherical bearing includes a split outer ring having a spherical radially inner facing surface, an axially outward facing shoulder and a radially outward extending first groove formed therein. A first snap ring is snap fit in the first groove. The spherical bearing includes an inner race defining a spherical exterior surface and having a radially inward extending second groove. A second snap ring is snap fit into the second groove. A seal extends between the outer ring and the inner race and includes a retaining ring secured to a second end of the seal. A first end of the seal defines a lip extending radially inward. The lip is seated against the second snap ring. The retaining ring is positioned between the first snap ring and the axially outward facing shoulder. The seal is axially compressed between the axially outward facing shoulder and the second snap ring.

12 Claims, 10 Drawing Sheets

(51) Int. Cl.
*F16C 23/04* (2006.01)
*F16J 3/04* (2006.01)
*F16C 11/06* (2006.01)

(56) References Cited

U.S. PATENT DOCUMENTS

| | | | |
|---|---|---|---|
| 3,591,192 A | 7/1971 | Sharp et al. | |
| 3,700,297 A | 10/1972 | Fickenwirth et al. | |
| 3,814,446 A | 6/1974 | Derman | |
| 3,822,100 A | 7/1974 | Reinsma et al. | |
| 3,848,938 A | 11/1974 | Stella et al. | |
| 3,897,121 A | 7/1975 | Riegler et al. | |
| 3,900,408 A | 8/1975 | Turner | |
| 4,034,996 A | 7/1977 | Manita et al. | |
| 4,052,804 A | 10/1977 | Stedman | |
| 4,080,013 A | 3/1978 | Koch | |
| 4,089,095 A | 5/1978 | Becker | |
| 4,109,976 A | 8/1978 | Koch | |
| 4,130,324 A | 12/1978 | Becker | |
| 4,210,405 A | 7/1980 | Jesswein | |
| 4,239,243 A | 12/1980 | Bainard et al. | |
| 4,311,316 A | 1/1982 | Cather, Jr. | |
| RE31,298 E | 7/1983 | Herbenar | |
| 4,447,094 A | 5/1984 | Trudeau et al. | |
| 4,483,569 A * | 11/1984 | Smith | F16C 11/0614 384/145 |
| 4,674,164 A | 6/1987 | McCloskey | |
| 4,812,073 A | 3/1989 | Blumberg et al. | |
| 4,869,602 A | 9/1989 | Berg | |
| 5,004,248 A | 4/1991 | Messenger et al. | |
| 5,033,872 A | 7/1991 | Ueno et al. | |
| 5,133,609 A | 7/1992 | Ishiguro | |
| 5,222,816 A | 6/1993 | Kondoh et al. | |
| 5,242,228 A | 9/1993 | Hattori | |
| 5,288,354 A | 2/1994 | Harris et al. | |
| 5,419,642 A | 5/1995 | McLarty | |
| 5,441,351 A | 8/1995 | Grunze | |
| 5,480,231 A | 1/1996 | Sasaki et al. | |
| 5,573,336 A | 11/1996 | Maroney | |
| 5,577,741 A | 11/1996 | Sink | |
| 5,655,845 A | 8/1997 | Lampart | |
| 5,993,065 A | 11/1999 | Ladzinski et al. | |
| 6,082,905 A | 7/2000 | Vignotto et al. | |
| 6,190,080 B1 | 2/2001 | Lee | |
| 6,217,031 B1 | 4/2001 | Catalano et al. | |
| 6,325,544 B1 | 12/2001 | Sasaki et al. | |
| 6,343,889 B1 * | 2/2002 | Hendricks | F16C 11/0623 403/127 |
| 6,349,470 B1 | 2/2002 | Sasaki et al. | |
| 6,626,575 B2 | 9/2003 | Hartl | |
| 6,652,179 B2 | 11/2003 | De Freitas | |
| 6,955,473 B2 | 10/2005 | Reddehase et al. | |
| 7,017,890 B2 | 3/2006 | Rechtien | |
| 7,244,074 B2 | 7/2007 | Abels et al. | |
| 7,464,968 B2 | 12/2008 | Sakazaki et al. | |
| 7,547,146 B2 | 6/2009 | Kinno et al. | |
| 7,568,840 B2 | 8/2009 | Smith et al. | |
| 7,654,766 B2 | 2/2010 | Zuge et al. | |
| 7,658,546 B2 | 2/2010 | Clarke et al. | |
| 8,038,351 B2 | 10/2011 | Arnold et al. | |
| 8,783,953 B2 | 7/2014 | Voisine et al. | |
| 8,801,318 B2 | 8/2014 | Knoble et al. | |
| 8,905,879 B2 | 12/2014 | Lannutti et al. | |
| 2003/0095729 A1 | 5/2003 | Post et al. | |
| 2003/0187512 A1 | 10/2003 | Frederick et al. | |
| 2006/0098908 A1 | 5/2006 | Clarke et al. | |
| 2006/0171775 A1 | 8/2006 | McLaughlin et al. | |
| 2007/0019895 A1 | 1/2007 | Smith et al. | |
| 2007/0065057 A1 | 3/2007 | Smith et al. | |
| 2008/0040886 A1 | 2/2008 | Arnold et al. | |
| 2011/0033227 A1 | 2/2011 | Kwon | |
| 2011/0091143 A1 | 4/2011 | Murphy et al. | |
| 2012/0128282 A1 * | 5/2012 | Voisine | F16C 23/046 384/145 |
| 2012/0248723 A1 | 10/2012 | Harper et al. | |
| 2013/0022299 A1 * | 1/2013 | Voisine | F16C 33/74 384/147 |
| 2014/0016888 A1 | 1/2014 | Harper et al. | |

FOREIGN PATENT DOCUMENTS

| | | |
|---|---|---|
| CN | 101240811 A | 8/2008 |
| CN | 201277260 Y | 7/2009 |
| CN | 201487175 U | 5/2010 |
| CN | 201494270 U | 6/2010 |
| CN | 201771976 U | 3/2011 |
| CN | 202883719 U | 4/2013 |
| CN | 203362845 U | 12/2013 |
| DE | 7011118 | 7/1970 |
| DE | 2755502 A1 | 6/1979 |
| DE | 8309873 U1 | 9/1983 |
| DE | 3725404 A1 | 3/1989 |
| DE | 3725404 C2 | 8/1989 |
| DE | 19834678 A1 | 2/2000 |
| DE | 19834677 C2 | 10/2002 |
| DE | 19834678 C2 | 10/2003 |
| DE | 102007039858 A1 | 3/2008 |
| DE | 10256334 B4 | 4/2009 |
| DE | 102008029449 A1 | 12/2009 |
| DE | 102008037990 A1 | 2/2010 |
| EP | 553565 A2 | 8/1993 |
| EP | 0903509 A1 | 3/1999 |
| EP | 1114938 A1 | 7/2001 |
| EP | 2505858 A2 | 10/2012 |
| EP | 2505858 A3 | 10/2013 |
| FR | 2056118 | 5/1971 |
| FR | 1488848 | 9/1973 |
| FR | 2171567 | 9/1973 |
| GB | 486220 | 6/1938 |
| GB | 915758 | 1/1963 |
| GB | 2400149 A | 6/2004 |
| JP | 402195013 A | 8/1990 |
| JP | 404025609 A | 1/1992 |
| JP | 06123315 A | 5/1994 |
| JP | 07190066 A | 7/1995 |
| JP | 2002054644 A | 2/2002 |
| JP | 2007100799 A | 4/2007 |
| JP | 2002139033 A | 5/2007 |
| JP | 4298713 B2 | 7/2009 |
| JP | 2001193735 A | 7/2011 |
| JP | 2014523509 A | 9/2014 |
| KR | 1020110015813 A | 2/2011 |
| WO | 2008074063 A1 | 6/2008 |
| WO | 2013000517 A1 | 1/2013 |
| WO | 2013013005 A1 | 1/2013 |
| WO | 2013117238 A1 | 8/2013 |

OTHER PUBLICATIONS

International Search Report for International Patent Application No. PCT/US2012/047331, dated Oct. 18, 2012.
International Preliminary Report for Patentability for International Patent Application No. PCT/US2012/047331, dated Jul. 8, 2013.
Extended Search Report for European patent application No. EP12162427.4-1758/2505858, dated Mar. 30, 2013.
Extended European Search Report for European Patent Application No. 14175715.3-1751 / 2829749, dated Aug. 18, 2015.

* cited by examiner

SPHERICAL BEARING WITH AXIALLY COMPRESSED ANNULAR SEAL

CROSS-REFERENCE TO RELATED APPLICATIONS

This application claims the benefit of U.S. Provisional Patent Applications Ser. Nos. 61/937,401, filed on Feb. 7, 2014, and 62/021,414, filed Jul. 7, 2014, which are incorporated herein by reference in their entirety.

FIELD OF THE INVENTION

The present invention relates generally to a seal for a spherical bearing, and more particularly to a spherical bearing having an annular seal that has a serpentine cross section and a retaining ring and lip at opposing ends of the seal for securing the seal in the spherical bearing by axial and radial compression.

BACKGROUND OF THE INVENTION

A typical bearing includes an inner member disposed partially in an outer member. The inner member can move relative to the outer member. A common problem in the bearing industry is the entry of contaminants into a space between the inner member and the outer member of the bearing. These contaminants, such as dust, metallic particles and dirt, inhibit the ability of the bearing to function properly (i.e., maximum reduction of friction).

One solution to this problem is the installation of a seal on the bearing. However, some seals do not keep all contaminants out of the bearing and can impair motion of the inner member relative to the outer member. In addition, movement of the inner member relative to the outer member can cause the seal to become dislodged. A means of preventing contaminant entry that would not impair relative motion of the inner member and the outer member, would better keep contaminants out of the bearing and would not allow the seal to be dislodged has long been sought in the industry.

SUMMARY OF THE INVENTION

In one aspect, there is disclosed herein a spherical bearing that includes a split outer ring having at least two axially extending fractures extending therethrough so that the outer ring defines a first segment and a separate second segment. The outer ring defines a spherical radially inner facing surface defining a cavity in the outer ring. The outer ring defines an axially outward facing shoulder proximate one or more axial ends of the outer ring. The outer ring has a radially outward extending first groove formed therein proximate one or more of the axial ends of the outer ring. A first snap ring is releaseably snap fit in the first groove. The spherical bearing includes an inner race defining a spherical exterior surface and having a radially inward extending second groove proximate one or more axial ends of the inner race. A second snap ring is releaseably snap fit into the second groove. A seal extends between the outer ring and the inner race. The seal has an annular body portion having a serpentine cross section extending between a first end and a second end thereof. The second end is positioned radially outward from the first end. The seal includes a retaining ring secured to the second end. The first end defines a lip extending radially inward. The lip is seated against the second snap ring. The retaining ring is positioned between the first snap ring and the axially outward facing shoulder. The seal is axially compressed between the first end and the second end to secure the seal between the axially outward facing shoulder and the second snap ring.

In another aspect, there is disclosed herein a spherical bearing that includes an outer ring having two axially extending fractures extending therethrough so that the outer ring defines a first segment and a separate second segment. The outer ring defines a spherical radially inner facing surface defining a cavity in the outer ring. The outer ring defines an axially outward facing shoulder proximate one or more of the axial ends of the outer ring. The outer ring defines a radially inward extending flange proximate one or more axially ends of the outer ring. A radially inward facing first groove is formed axially inward from one or more of the radially inward extending flanges. The spherical bearing includes an inner race that defines a spherical exterior surface and has a radially inward extending second groove proximate one or more axial ends of the inner race. A snap ring is releaseably snap fit into the second groove. A seal extends between the outer ring and the inner race. The seal has an annular body portion and a serpentine cross section extending between a first end and a second end thereof. The second end is positioned radially outward from the first end. The seal includes a retaining ring secured to the second end. The first end defines a lip extending radially inward. The lip is seated against the snap ring. The retaining ring is seated in the first groove with the first segment and the second segment being fitted around the retaining ring. The seal is axially compressed between the first end and the second end to secure the seal between the axially outward facing shoulder and the snap ring.

In another aspect, there is disclosed herein a spherical bearing that includes an outer ring having two axially extending fractures extending therethrough so that the outer ring defines a first segment and a separate second segment. The outer ring defines a spherical radially inner facing surface defining a cavity in the outer ring. The outer ring defines an axially outward facing shoulder and a radially outward extending groove formed therein proximate one or more axial ends of the outer ring. A snap ring is releaseably snap fit in the groove. The spherical bearing includes an inner race defining a spherical exterior surface and having a radially outward extending flange one or more axial ends of the inner race. The radially outward extending flange defines an axially inward facing shoulder. A seal extends between the outer ring and the inner race. The seal has an annular body portion having a serpentine cross section extending between a first end and a second end thereof. The second end is positioned radially outward from the first end. The seal includes a retaining ring secured to the second end thereof. The first end defines a lip extending radially inward. The lip is seated against the axially inward facing shoulder. The retaining ring is seated in the groove with the first segment and the second segment fitted around the retaining ring. The seal is axially compressed between the first end and the second end to secure the seal between the axially inward facing shoulder and the at least one axially outward facing shoulder.

DETAILED DESCRIPTION

Figure 1:
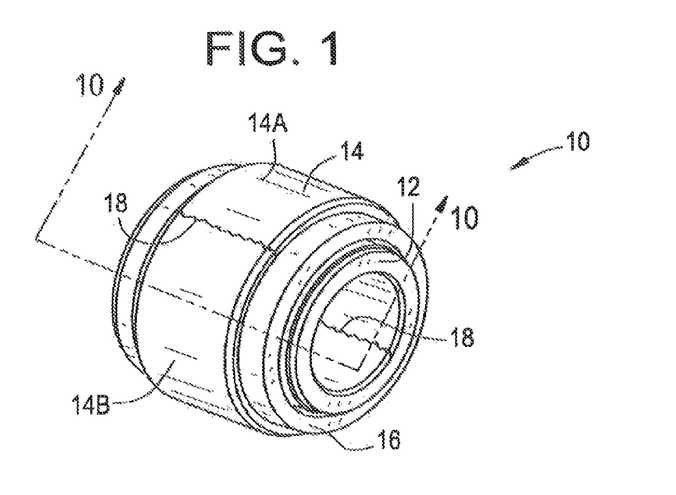
FIG. 1 is a perspective view of a spherical bearing having a double fracture outer ring.

As shown in FIG. 1, a spherical bearing is generally designated by the numeral 10. The spherical bearing 10 has an inner ring 12 disposed partially in an outer ring 14. A seal 16 extends between the inner ring 12 and the outer ring 14. The outer ring 14 is a split outer ring that has two fractures 18 extending axially therethrough so that the outer ring 14 defines a first segment 14A and a second segment 14B. While two fractures 18 are shown and described, the present invention is not limited in this regard as more than two fractures may be employed without departing from the broader aspects defined herein.

Figure 2:
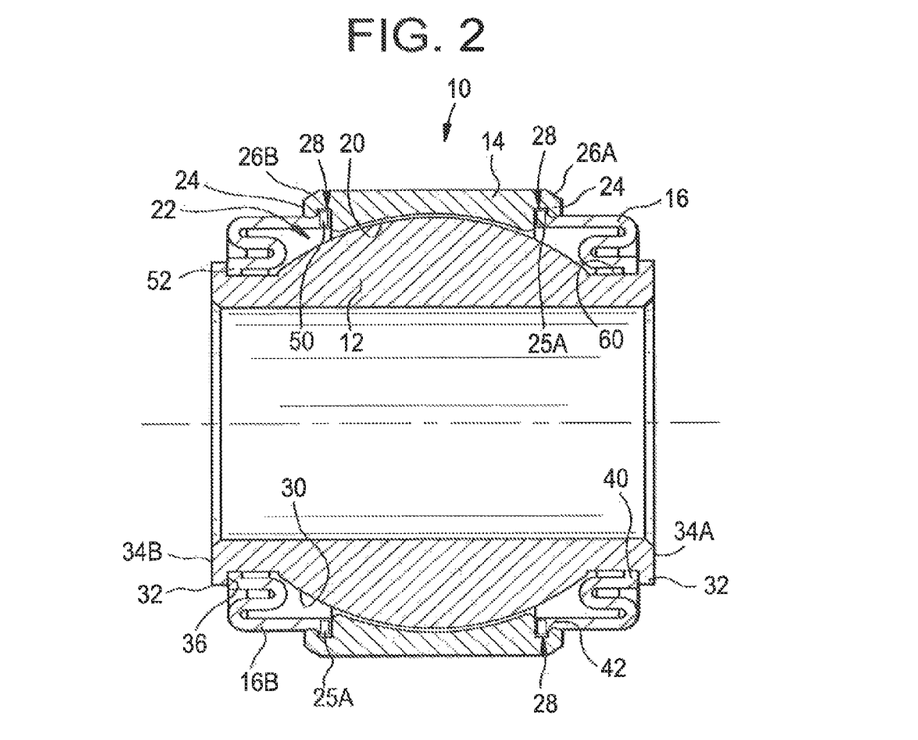
FIG. 2 is a cross sectional view of the spherical bearing of FIG. 1.
Figure 5A:
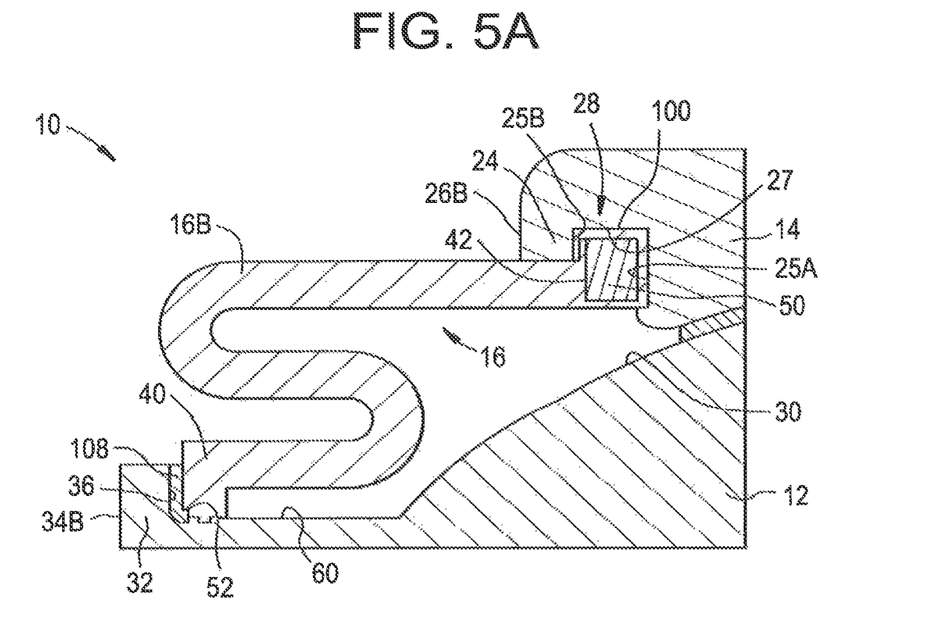
FIG. 5A is a cross sectional view of a portion of the spherical bearing of the present invention.

Referring to FIGS. 2 and 5(A), the outer ring 14 defines a spherical radially inner facing surface 20 that defines a cavity 22 in the outer ring 14. The outer ring 14 defines a radially inward extending flange 24 on each of axially facing end 26A and 26B of the outer ring 14. Each of the radially inward extending flanges 24 and the axially facing ends 26A and 26B define a radially inward facing groove 28. Each of the grooves 28 is defined by an axially outward facing shoulder 25A and an axially inward facing shoulder 25B that are joined by a radially inward facing base 27. The inner race 12 defines a spherical exterior surface 30 and has a radially outward extending flange 32 on each axial end 34A and 34B of the inner race 12. The radially outward extending flange 32 defines an axially inward facing shoulder 36. A substantially cylindrical radially outward facing mating surface 60 is located axially inward of the shoulder 36.

Figure 3:
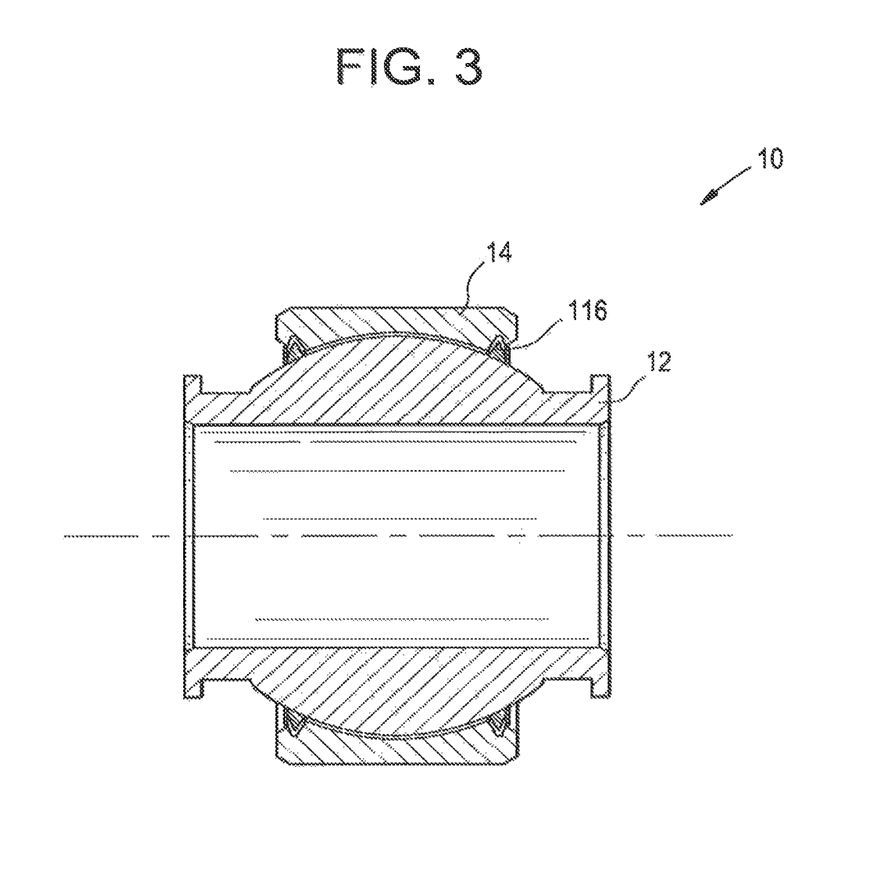
FIG. 3 is another embodiment of the spherical bearing of FIG. 1 having a seal having a V-shaped cross section.
Figure 4:
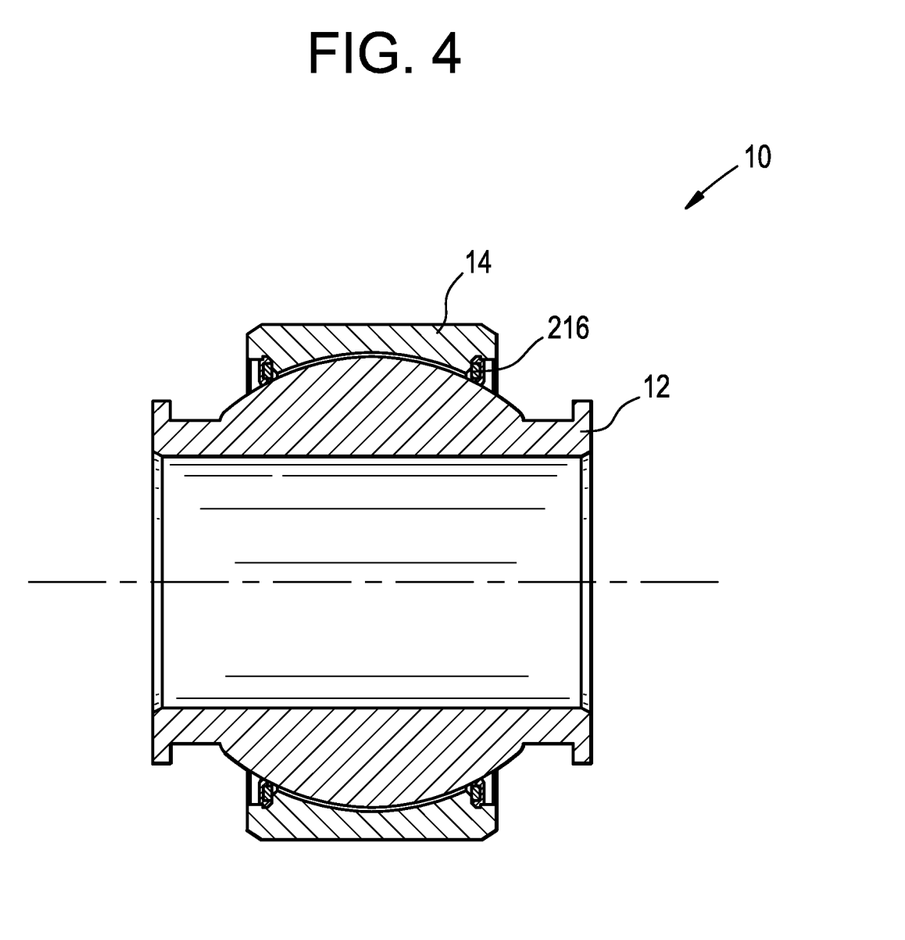
FIG. 4 is another embodiment of the spherical bearing of FIG. 1 having a metal backed elastomeric seal.

Referring to FIGS. 1 and 5A, the seal 16 has an annular body portion 16B having a serpentine cross section that extends between a first end 40 and a second end 42. The second end 42 is positioned radially outward from the first end 40. A retaining ring 50 is secured to the second end 40 of the seal 16. The first end 40 of the seal 16 defines a lip 52 extending radially inward. The lip 52 is seated against the axially inward facing shoulder 36 of the inner race 12. The retaining ring 50 is seated in the groove 28 with the first segment 14A and the second segment 14B being fitted around the retaining ring 50 to facilitate assembly and installation of the retaining ring 50 and the seal 16 and to mitigate the seal 16 from being pulled out of the bearing 10. The seal 16 is held in place between the inner race 12 and the outer ring 14 by axial and radial compression between the first end 40 and the second end 42 to secure the seal 16 between the groove 28 and the shoulder 36. As shown in FIG. 3, in one embodiment, the bearing 10 has a seal 116 having a V-shaped cross section extending between the inner ring 12 and the outer ring 14. As shown in FIG. 4, in one embodiment, the bearing 10 has a metal backed elastomeric seal 216 extending between the inner ring 12 and the outer ring 14.

In one embodiment, the outer ring 14 is manufactured from an ImpactTuff® (a registered trademark of Roller Bearing Company of America) SAE 8620 surface hardened material. In one embodiment, retaining ring 50 is made from a metallic material.

In one embodiment, the seal 16 is made from an elastomeric material. In one embodiment, the seal 16 is made from a nitrile material. In one embodiment, as shown in FIG. 5A, the retaining ring 50 is encapsulated in the elastomeric material, for example, in the nitrile material.

In one embodiment, as shown in FIG. 5A, the first end 40 of the seal 16 has a cylindrical outer surface. In one embodiment, as shown in FIG. 5A, the second end 42 of the seal 16 has a cylindrical radially outward facing surface 100.

Figure 6:
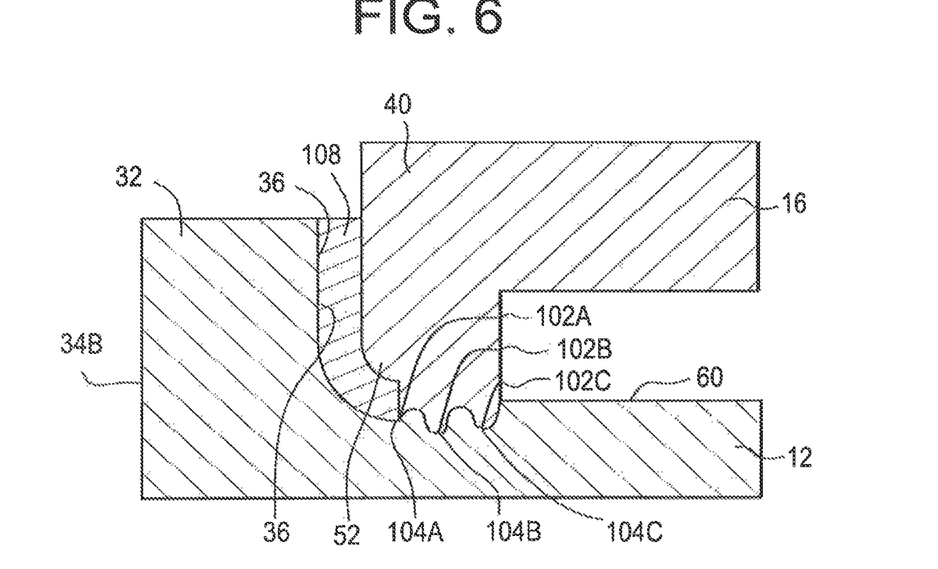
FIG. 6 is an enlarged cross sectional view of the portion of the spherical bearing of FIG. 5.

As shown in FIG. 6, a portion of the inner member 12 proximate the axially inward facing shoulder 36 is the substantially cylindrical radially outward facing mating surface 60 for receiving an inner portion of the seal 16.

In one embodiment, as shown in FIG. 6, the first end 40 of the seal 16 includes a plurality of radially inward facing lips, for example three lips, 102A, 102B and 102C. In one embodiment, as shown in FIG. 6, the portion of the inner member 12 proximate the axially inward facing shoulder 36 includes a plurality of grooves, for example three grooves 104A, 104B and 104C. In one embodiment, as illustrated in FIG. 6, the grooves 104A, 104B and 104C are configured to receive the radially inward facing lips 102A, 102B and 102C.

In one embodiment, as shown in FIGS. 5A and 6, the first end 40 of the seal 16 includes a low coefficient of friction polymer 108 bonded thereto. The low coefficient of friction polymer 108 slidingly engages the axially inward facing shoulder 36. While the low coefficient of friction polymer 108 is shown and described as being bonded to the first end 40 of the seal 16 and engaging the axially inward facing shoulder 36, the present invention is not limited in this regard as other configurations such as those illustrated in FIG. 5B may be employed.

Figure 5B:
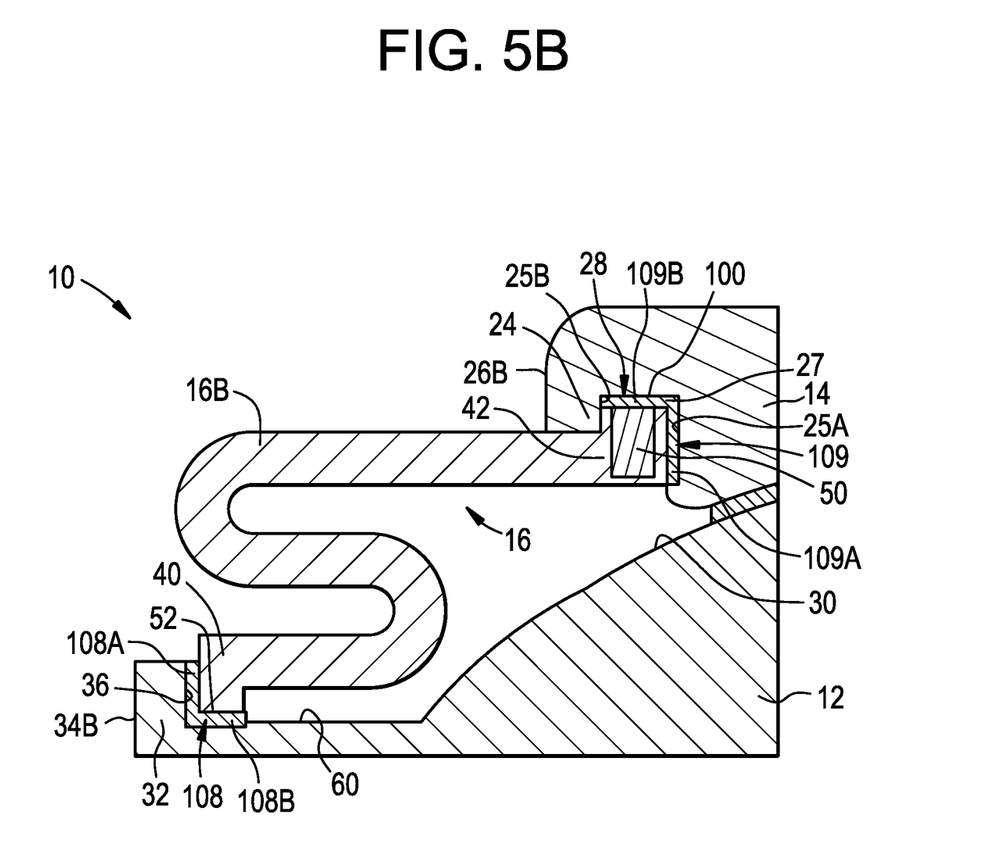
FIG. 5B is a cross sectional view of a portion of the spherical bearing of the present invention illustrating an alternative configuration for a low coefficient of friction polymer on the seal.

In the embodiment illustrated in FIG. 5B, the low coefficient of friction polymer 108 is bonded to the first end 40 of the seal 16 and has an L-shaped configuration having an axially outward facing leg 108A that slidingly engages the shoulder 36 and a radially inward facing leg 108B that slidingly engages the cylindrical radially outward facing mating surface 60. In another embodiment shown in FIG. 5B, a low coefficient of friction polymer 109 is bonded to the second end 42 of the seal 16 and has an L-shaped configuration having an axially inward facing leg 109A that slidingly engages the axially outward facing shoulder 25A and a radially outward facing leg 109B that slidingly engages the radially inward facing base 27 and the axially inward facing shoulder 25B of the groove 28.

Figure 7:
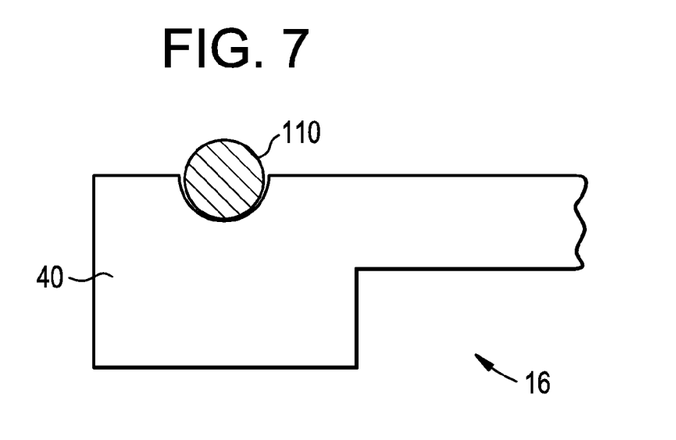
FIG. 7 is a cross sectional view of a portion of the seal with a biasing member seated on a portion of the seal.
Figure 8:
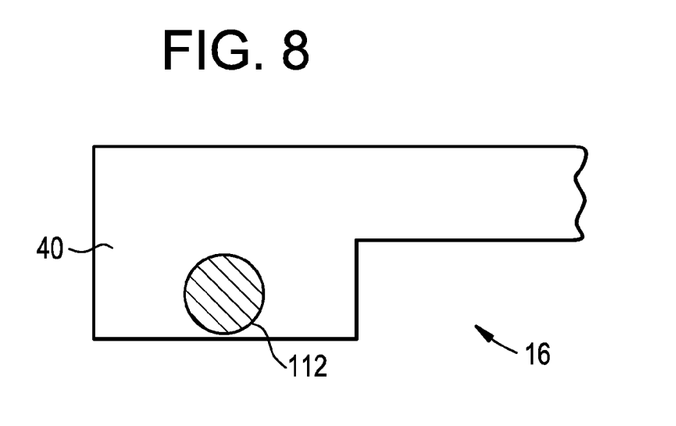
FIG. 8 is an cross sectional view of an alternative embodiment of the seal with a biasing member embedded in the seal.
Figure 9:
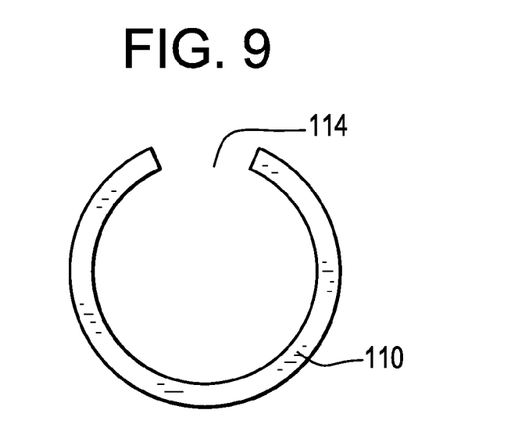
FIG. 9 is a top view of a biasing member of the present invention.

In one embodiment, as shown in FIG. 7, a biasing ring 110 is disposed in the first end 40 of the seal 16 to frictionally engage the seal 16 with the axially inner member 12. In one embodiment, as shown in FIG. 8, the biasing ring 112 is encapsulated in the seal 16. In one embodiment, as shown in FIG. 9, the biasing ring is a split ring spring 110 having a split 114.

Figure 10:
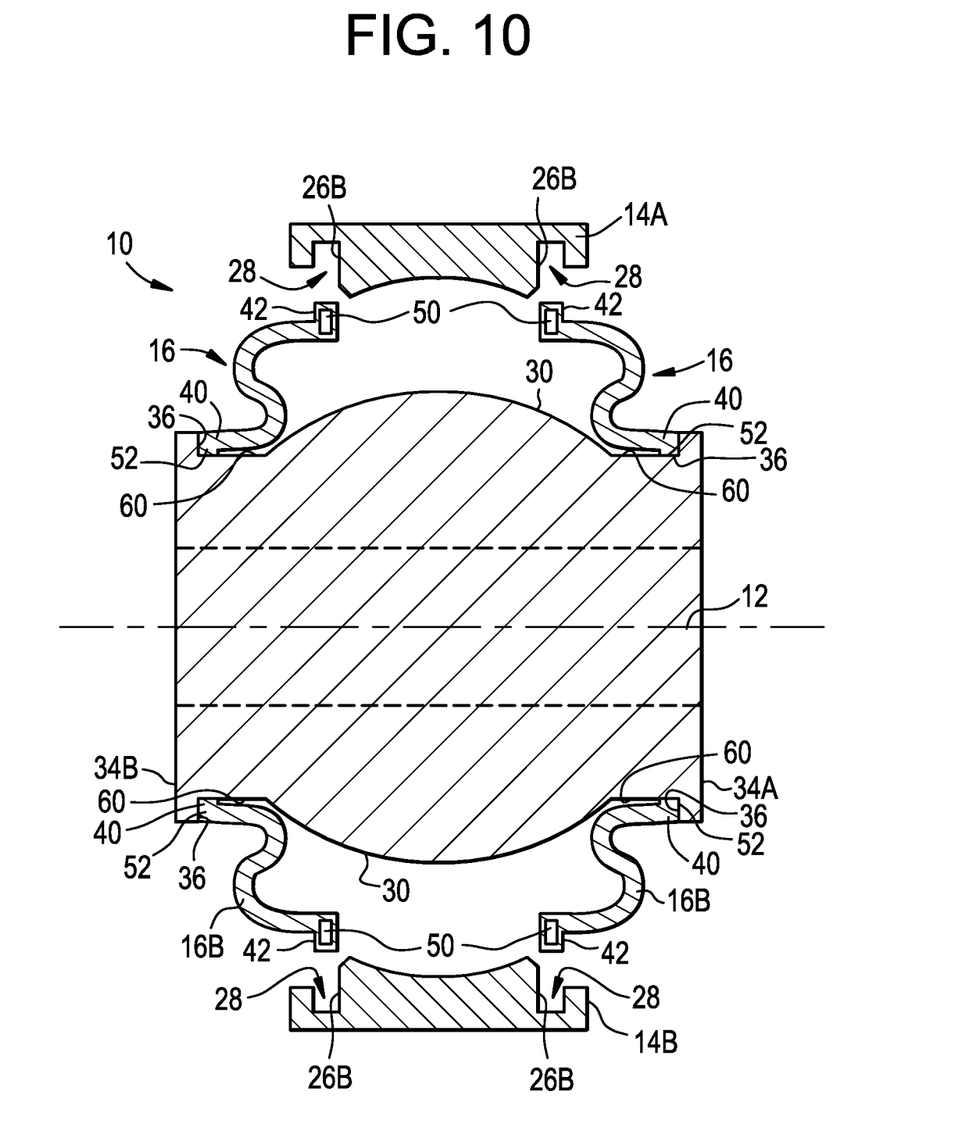
FIG. 10 is a side view of the bearing assembly of FIG. 1, taken across line 10-10, wherein an outer ring defines a disengaged position and the seal defines a decompressed position.

As best shown in FIG. 10, the retaining ring 50 is seated in the groove 28 with the first segment 14A and the second segment 14B around the retaining ring 50. In one embodiment, as best shown in FIG. 10, the seal 16 is axially and radially compressed between the first end 40 and the second end 42 to secure the seal 16 between the groove 28 and the shoulder 36. The first end 40 of the seal 16 axially abuts the shoulder 36, thereby engaging the first end 40 with the inner member 12. The second end 42 of the seal 16 is positioned in the radially inward facing groove 28, thereby engaging the second end 42 with the first segment 14A and the second segment 14B. Upon adjoinment of the first segment 14A and the second segment 14B, the seal 16 is maintained in axial and radial compression and is elastically deformed in the serpentine shape.

Figure 11:
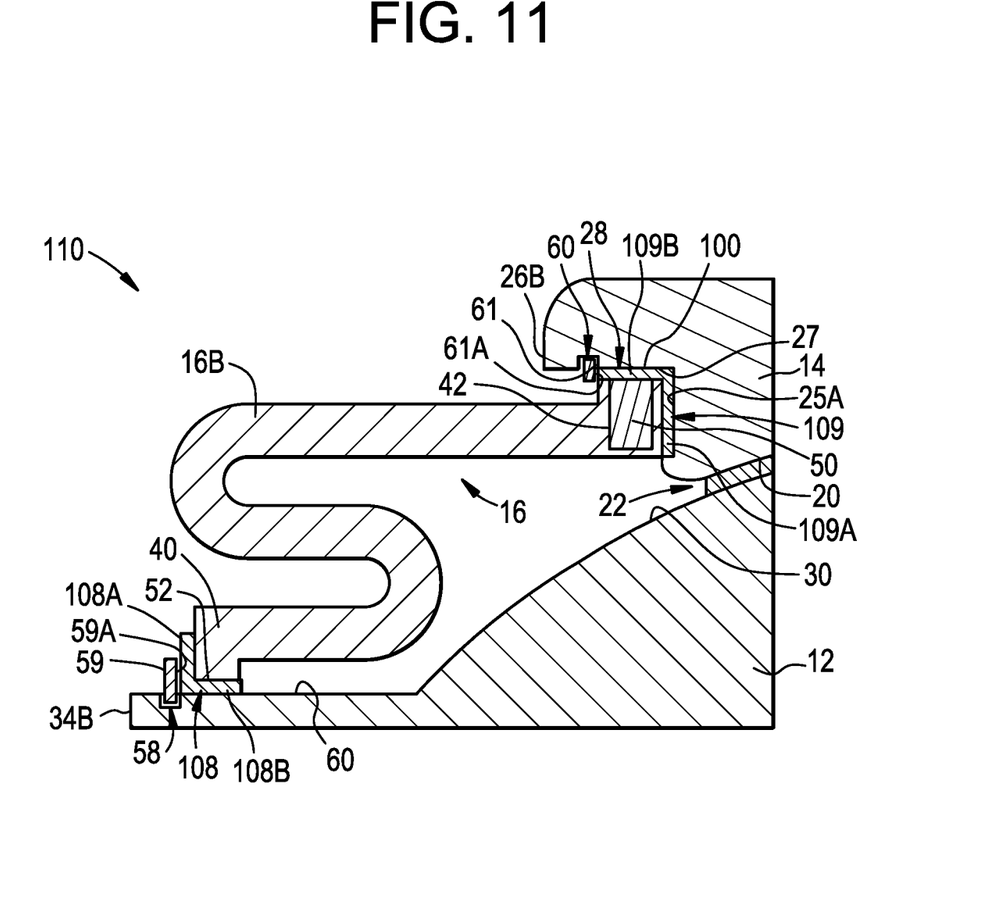
FIG. 11 is a cross sectional view of a portion of the spherical bearing of the present invention illustrating an alternate configuration having snap rings.

Referring to FIG. 11, the bearing 110 is similar to the bearing 10 of FIG. 5B except that the bearing 110 has no radially inward extending flanges 24, no axially inward facing shoulders 25B, no radially outward extending flanges 32 and no axially inward facing shoulders 36. Instead, the inner ring 12 of the bearing 110 has a radially inward extending groove 58 formed therein proximate each of the ends 34A (FIGS. 2) and 34B of the inner ring 12. A snap ring 59 is releaseably snap fit in the groove 58. An axially inward facing side 59A of the snap ring 59 slidingly engages the leg 108A of the low coefficient of friction polymer 108 and restrains axially outward movement of the first end 40 of the seal 16. The outer ring 14 includes a radially outward extending groove 60 formed proximate each of the axially facing ends 26A (FIGS. 2) and 26B. A snap ring 61 is releaseably snap fit in the groove 60. An axially inward facing side 61A of the snap ring 61 slidingly engages the leg 109B of the low coefficient of friction polymer 109 and restrains axially outward movement of the second end 42 of the seal 16.

Figure 12:
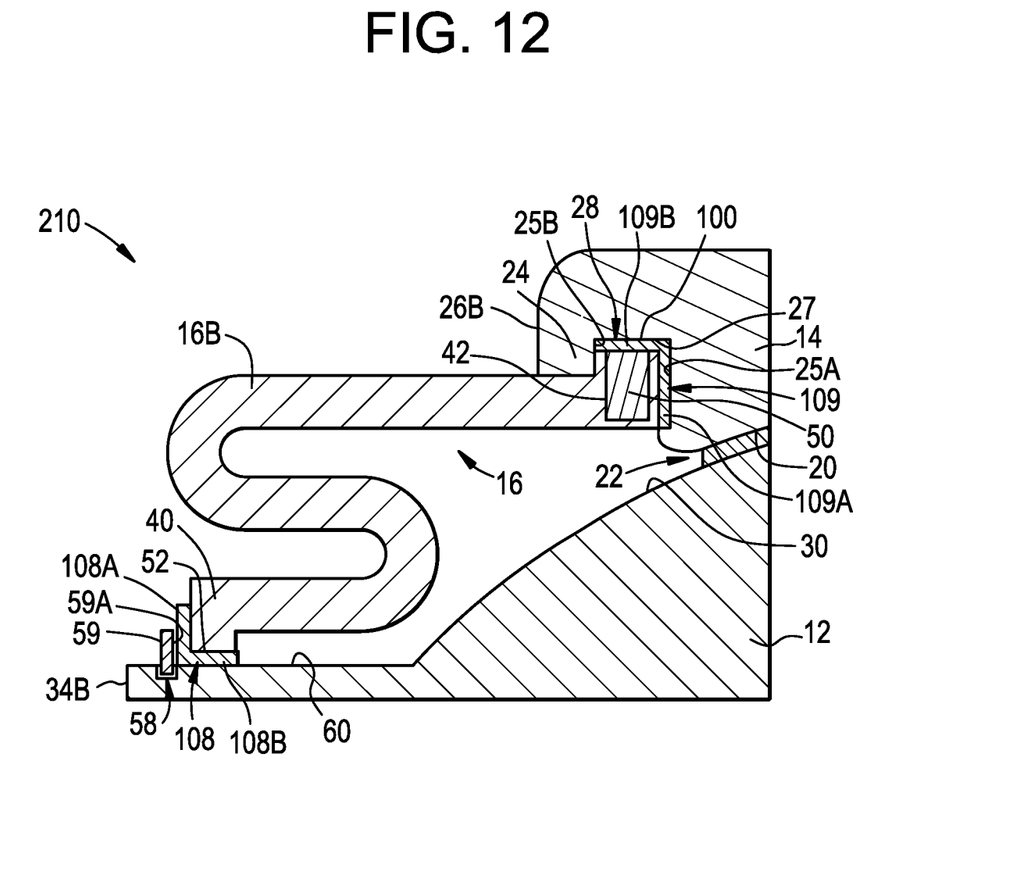
FIG. 12 is a cross sectional view of a portion of the spherical bearing of the present invention illustrating an alternate configuration having a snap ring seated in a groove in the inner race.
Figure 13:
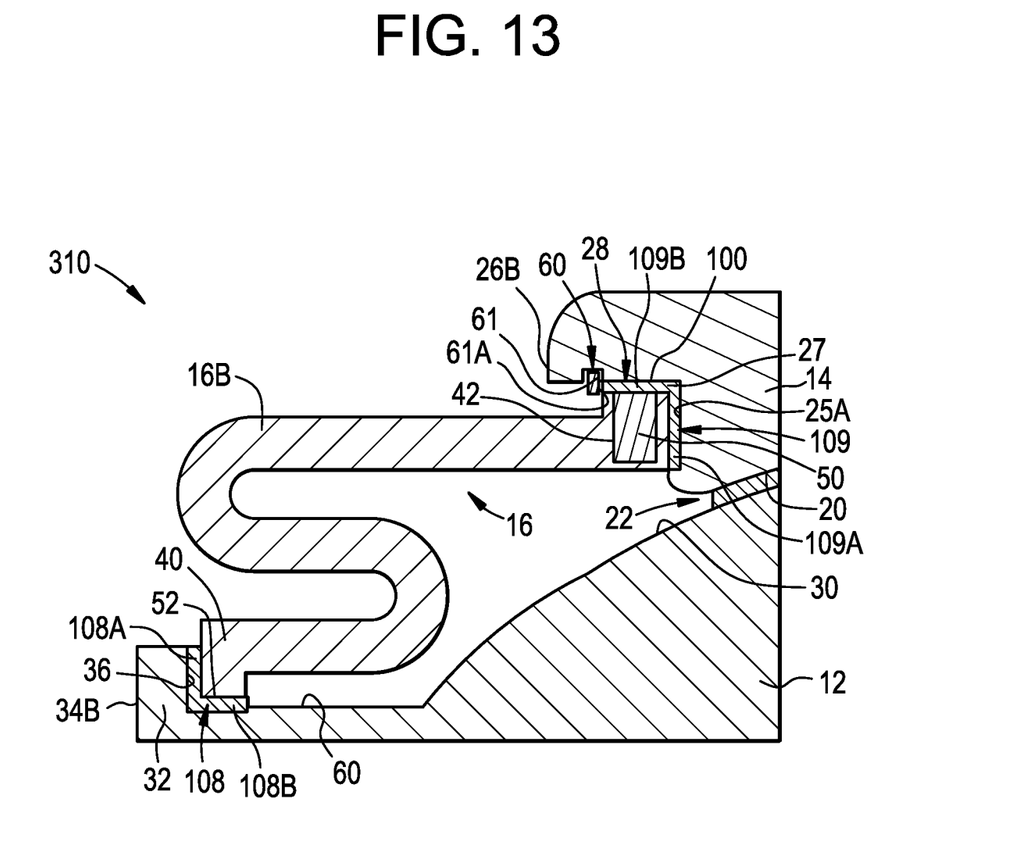
FIG. 13 is a cross sectional view of a portion of the spherical bearing of the present invention illustrating an alternate configuration having a snap ring seated in a groove in the outer race.

While the bearing 110 is shown and described as having no radially inward extending flanges 24, no axially inward facing shoulder 25B, no radially outward extending flanges 32 and no axially inward facing shoulder 36, the present invention is not limited in this regard as the bearing 110 may employ the radially inward extending flanges 24 and the axially inward facing shoulders 25B in lieu of the groove 60 and the snap ring 61 (see FIG. 12) or employ the radially outward extending flanges 32 and the axially inward facing shoulders 36 in lieu of the groove 58 and the snap ring 59 (See FIG. 13).

Referring to FIG. 12, a spherical bearing 210 includes a split outer ring 14 having at least two axially extending fractures 18 (FIG. 1) therethrough so that the outer ring 14 defines a first segment 14A (FIG. 1) and a separate second segment 14B (FIG. 1). The outer ring 14 defining a spherical radially inner facing surface 20 defining a cavity 22 in the outer ring 14. The outer ring 14 defines an axially outward facing shoulder 25A proximate opposing axial ends of the outer ring 14. The outer ring 14 defines a radially inward extending flange 24 proximate an axially end of the outer ring 14. A radially inward facing first groove 28 is formed axially inward from the radially inward extending flange 24. The spherical bearing 210 includes an inner race 12 defining a spherical exterior surface 30 and having a radially inward extending second groove 58 proximate each axial end of the inner race 12. A snap ring 59 is releaseably snap fit into the second groove 58. A seal 16 has an annular body portion and has a serpentine cross section that extends between a first end 40 and a second end 42 of the seal 16. The seal 16 extends between the outer ring 14 and the inner race 12. The second end is positioned radially outward from the first end 40. A retaining ring 50 secured to the second end 42, for example is embedded in the second end 42. The first end 40 defines a lip 52 extending radially inward. The lip 52 is seated against the snap ring 59. The retaining ring 50 is seated in the first groove 28 with the first segment 14A and the second segment 14B being fitted around the retaining ring 50. The seal 16 is axially compressed between the first end 40 and the second end 42 to secure the seal 16 between the outward facing shoulder 25A and the snap ring 59.

Referring to FIG. 13, a spherical bearing 310 includes a split outer ring 14 having two axially extending fractures 18 (FIG. 1) therethrough so that the outer ring 14 defines a first segment 14A (FIG. 1) and a separate second segment 14B (FIG. 1). The outer ring 14 defining a spherical radially inner facing surface 20 defining a cavity 22 in the outer ring 14. The outer ring 14 defines an axially outward facing shoulder 25A and a radially outward extending groove 60 formed therein proximate at least one axial end of the outer ring 14. A snap ring 61 is releaseably snap fit in the groove 60. An inner race 12 defines a spherical exterior surface 30 and has a radially outward extending flange 32 on an axial end of the inner race 12. The radially outward extending flange 32 defines an axially inward facing shoulder 36. A seal 16 has an annular body portion and has a serpentine cross section extending between a first end 40 and a second end 42. The seal 16 extends between the outer ring 14 and the inner race 12. The second end 42 is positioned radially outward from the first end 40. A retaining ring 50 is secured to the second end 42, for example, is embedded in the second end. The first end 40 defines a lip 52 extending radially inward. The lip 52 is seated against the axially inward facing shoulder 36. The retaining ring 50 is seated in the groove 28 with the first segment 14A and the second segment 14B being fitted around the retaining ring 50. The seal 16 is axially compressed between the first end 40 and the second end 42 to secure the seal 16 between the axially inward facing shoulder 36 and the axially outward facing shoulder 25A.

As used herein, the term snap ring 59, 61 refers to an annular ring that is substantially flat in a relaxed state. The annular ring can be elastically flexed into a conical shape or other deformed shape in a combined radial and axial direction to allow an inside diameter and/or an outside diameter thereof to clear an edge of a groove so that the snap ring 59, 61 can be fit or snapped into the groove.

Although the present invention has been disclosed and described with reference to certain embodiments thereof, it should be noted that other variations and modifications may be made, and it is intended that the following claims cover the variations and modifications within the true scope of the invention.

What is claimed is:
1. A spherical bearing comprising:
   an outer ring having at least two axially extending fractures therethrough so that the outer ring defines a first segment and a second segment, the outer ring defining a spherical radially inner facing surface defining a cavity in the outer ring, the outer ring defining at least one axially outward facing shoulder and a radially outward extending first groove formed therein proximate at least one axial end of the outer ring, a first snap ring releaseably snap fit in the first groove;

an inner race defining a spherical exterior surface and having a radially inward extending second groove proximate at least one axial end of the inner race, and a second snap ring releaseably snap fit into the second groove;

a seal extending between the outer ring and the inner race, the seal having an annular body portion having a serpentine cross section extending between a first end and a second end thereof, the second end being positioned radially outward from the first end;

a retaining ring secured to the second end;

the first end defining a lip extending radially inward;

the lip being seated against the second snap ring;

the retaining ring being positioned between the first snap ring and the at least one axially outward facing shoulder; and the seal being axially compressed between the first end and the second end to secure the seal between the at least one axially outward facing shoulder and the second snap ring.

2. The spherical bearing of claim 1, wherein the outer ring is manufactured from an SAE 8620 surface hardened material.

3. The spherical bearing of claim 1, wherein the retaining ring comprises a metallic material.

4. The spherical bearing of claim 1, wherein the seal comprises an elastomeric material.

5. The spherical bearing of claim 4, wherein the retaining ring is substantially encapsulated in the elastomeric material.

6. The spherical bearing of claim 1, wherein the seal comprises a nitrile material.

7. A spherical bearing comprising:

an outer ring having at least two axially extending fractures therethrough so that the outer ring defines a first segment and a second segment, the outer ring defining a spherical radially inner facing surface defining a cavity in the outer ring, the outer ring defining at least one axially outward facing shoulder, the outer ring defining a radially inward extending flange proximate an axially end of the outer ring, a radially inward facing first groove formed axially inward from the radially inward extending flange;

an inner race defining a spherical exterior surface and having a radially inward extending second groove proximate at least one axial end of the inner race, and a snap ring releaseably snap fit into the at least one second groove;

a seal extending between the outer ring and the inner race, the seal having an annular body portion having a serpentine cross section extending between a first end and a second end, the second end being positioned radially outward from the first end;

a retaining ring secured to the second end;

the first end defining a lip extending radially inward;

the lip being seated against the snap ring;

the retaining ring being seated in the first groove with the first segment and the second segment being fitted around the retaining ring; and the seal being axially compressed between the first end and the second end to secure the seal between the at least one axially outward facing shoulder and the snap ring.

8. The spherical bearing of claim 7, wherein the outer ring is manufactured from an SAE 8620 surface hardened material.

9. The spherical bearing of claim 7, wherein the retaining ring comprises a metallic material.

10. The spherical bearing of claim 7, wherein the seal comprises an elastomeric material.

11. The spherical bearing of claim 10, wherein the retaining ring is substantially encapsulated in the elastomeric material.

12. The spherical bearing of claim 7, wherein the seal comprises a nitrile material.

* * * * *